(12) United States Patent
König et al.

(10) Patent No.: US 7,088,108 B2
(45) Date of Patent: Aug. 8, 2006

(54) METHOD FOR DETECTING AN OFFSET DRIFT IN A WHEATSTONE MEASURING BRIDGE

(75) Inventors: Peter König, Dresden (DE); Stefan Krone, Dresden (DE); Stefan Woschech, Dresden (DE); Matthias Böhm, Dresden (DE); Andreas Schroth, Dresden (DE)

(73) Assignees: Fraunhofer-Gesellschaft zur Forderung der angewandten Forschung e.V., Munich (DE); Intelligente Sensorsysteme Dresden GmbH, Dresden (DE)

( * ) Notice: Subject to any disclaimer, the term of this patent is extended or adjusted under 35 U.S.C. 154(b) by 0 days.

(21) Appl. No.: 11/060,921

(22) Filed: Feb. 18, 2005

(65) Prior Publication Data

US 2005/0194980 A1    Sep. 8, 2005

(30) Foreign Application Priority Data

Feb. 20, 2004  (DE)  ............... 10 2004 008 850
Nov. 16, 2004  (DE)  ............... 10 2004 056 133

(51) Int. Cl.
*G01R 31/08*   (2006.01)
*G01R 27/02*   (2006.01)
*G01R 27/08*   (2006.01)

(52) U.S. Cl. ............... 324/610; 324/526; 324/706
(58) Field of Classification Search ........... 324/610, 324/706, 526
See application file for complete search history.

(56) References Cited

U.S. PATENT DOCUMENTS

| | | | | |
|---|---|---|---|---|
| 3,873,917 A | * | 3/1975 | Kreuzer | 324/660 |
| 5,345,184 A | * | 9/1994 | Andoh | 324/720 |
| 5,440,234 A | * | 8/1995 | Kondo | 324/526 |
| 5,877,626 A | * | 3/1999 | Umemoto et al. | 324/207.21 |
| 6,750,665 B1 | * | 6/2004 | Takeuchi | 324/725 |
| 6,870,236 B1 | * | 3/2005 | Johnson | 257/414 |
| 2002/0047716 A1 | * | 4/2002 | Maher et al. | 324/706 |

* cited by examiner

*Primary Examiner*—Anjan Deb
*Assistant Examiner*—Amy He
(74) *Attorney, Agent, or Firm*—Young & Basile, P.C.

(57) ABSTRACT

In a method for detecting an offset drift in a resistive Wheatstone measuring bridge, a switch is made between a measuring mode and a testing mode without interfering in the internal structure of the measuring bridge. In testing mode, two sensor resistors that act in the same way and lie in different bridge arms in the measuring mode are connected in series, and a voltage level occurring in the connection of these sensor resistors is compared with a reference voltage. Preferably the sensor resistor that acts in a different way and lies between the two series-connected sensor resistors acting in the same way is bridged. The reference voltage is advantageously formed by resistive division of the voltage applied to the series connection of the sensor resistors. The testing mode may expediently be switched in such a way that the two pairs of sensor resistors acting in the same way are respectively tested in succession.

20 Claims, 1 Drawing Sheet

METHOD FOR DETECTING AN OFFSET DRIFT IN A WHEATSTONE MEASURING BRIDGE

The invention relates to a method for detecting an offset drift in a resistive Wheatstone measuring bridge that may be switched between a measuring mode and a testing mode without altering the inner structure of the measuring bridge.

From DE 101 33 525 A1 is known a sensor designed in particular to measure pressure and having a resistive measuring bridge, the diagonal voltage of which is tapped to determine the measured variable. To check the functioning of the individual bridge elements, a switching device is provided by which the measuring bridge can be switched between a measuring mode and a testing mode, the arrangement of the bridge elements relative to one another altering. This switching takes place in such a way that the bridge elements connected in series in the measuring mode are connected in parallel in the testing mode. In particular, two switches are provided. In each case they are connected to a center node of the measuring bridge at which the diagonal voltage is tapped. In testing mode, each center node is connected via the associated switch to a constant-current source. An essential property of this sensor consists in the fact that the diagonal voltage of the measuring bridge in testing mode is independent of a change in the measured variable.

Due to the use of the constant-current sources, the known sensor is expensive, and, if the current sources do not have a very high synchronism, the drift determination is impaired and an acceptable signal can only be detected reliably when there is a relatively large offset drift. This sensor also has basically no great sensitivity for drift detection.

SUMMARY OF THE INVENTION

The object of the present invention, therefore, is to provide a method for detecting an offset drift in a resistive Wheatstone measuring bridge, which may be switched between a measuring mode and a testing mode without altering the inner structure of the measuring bridge, which method requires a simple test device and operates with high accuracy.

Because in testing mode two sensor resistors that act in the same way and lie in different bridge arms are connected in series and a voltage level occurring in the connection of these sensor resistors is compared with a reference voltage, the divisor ratio of two similar resistors in a series connection does not alter if both resistors are altered in the same ratio by the measured variable and possible disturbance variables. "Similar" here means both that the nominal values of the two sensor resistors are approximately the same and that their coefficients for the various dependent factors (temperature, pressure, etc.) have the same value. The changes in resistance caused by the measured variable and the disturbance variables at the two resistors remain in a (largely) constant ratio and thus only insignificantly alter the divisor ratio of the series connection.

Only the change at one of the sensor resistors, which change also results in a corresponding offset drift, alters this ratio and is thus detectable largely independently of other influences.

In order to eliminate the influence of the resistor that acts differently and is arranged between the two resistors acting in an equivalent manner, the different resistor is preferably bridged in testing mode. If, in spite of this bridging, it should still have a value that cannot be disregarded, its influence can be further reduced or even completely eliminated by mathematical determination of a mean voltage between the two resistors acting in the same way.

Since the respective switching state in testing mode can always test a pair of similar resistors, the method is advantageously designed that the testing mode can be switched in such a way that the two pairs of resistors of the measuring bridge that respectively act in the same way are tested in succession.

BRIEF DESCRIPTION OF THE DRAWINGS

The invention is explained in greater detail below with the aid of an embodiment illustrated in the figures. These show.

DETAILED DESCRIPTION OF THE PREFERRED EMBODIMENT

The present method can be used for detecting an offset drift in all those sensors that use a resistive Wheatstone measuring bridge having at least two similar sensitive elements to determine a measured variable. Particularly in safety-critical applications, such as pressure measurement in the automobile field or process automation in which the falsification of the measured variables due to drift influences can have serious consequences, such detection is important.

Figure 1:
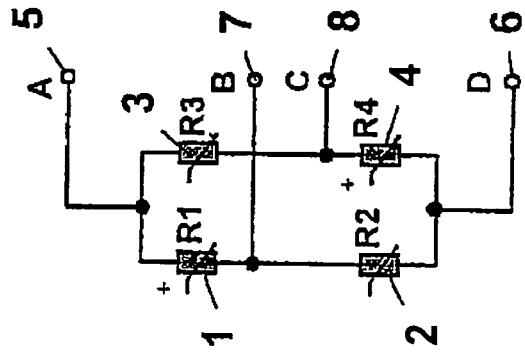
FIG. 1 is a Wheatstone measuring bridge in measuring mode.

The Wheatstone measuring bridge according to FIG. 1 has, in a known manner, two pairs of resistors 1 to 4, which each respond in the same way to a measure variable such as pressure or temperature. The resistors of one pair, i.e., resistors 1 and 4 or resistors 2 and 3, alter in the same way. Thus, for example, when the measured variable increases, resistors 1 and 4 experience a positive change and resistors 2 and 3 experience a negative change of their resistance values. The respectively-similar resistors are located diagonally with respect to one another in different bridge arms located parallel to one another between the two power supply connections 5 and 6.

The measuring bridge can also be so designed that only one of the pairs of similar resistors responds to the measured variable, for example, only resistors 1 and 4, while resistors 2 and 3 are not influenced by the measured variable. However, this reduces the measuring sensitivity of the measuring bridge.

The measured voltage dependent on the measured variable is taken between the two measuring connections 7 and 8.

Figure 3:
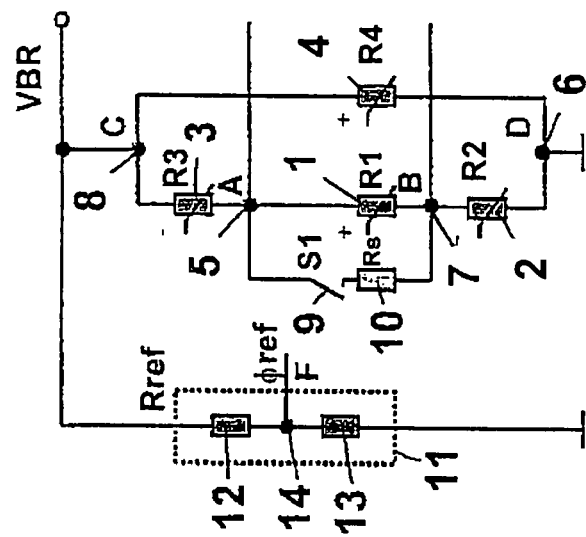
FIG. 3 is the Wheatstone measuring bridge of FIG. 1 in the second switching state of the testing mode.
Figure 2:
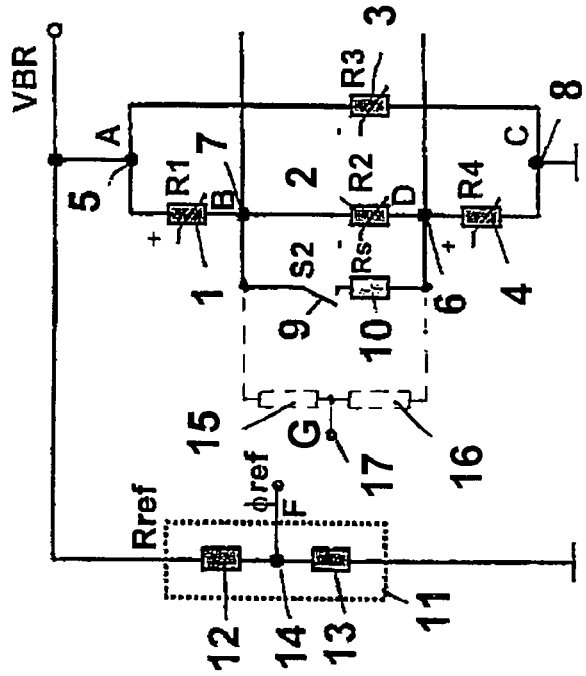
FIG. 2 is the Wheatstone measuring bridge of FIG. 1 in the first switching state of the testing mode.

When there is a switch from the measuring mode shown in FIG. 1 to the testing mode shown in FIG. 2 or 3, the internal structure of the measuring bridge is not altered. This is important since the individual resistors are normally already connected by the manufacturer to the measuring bridge, and thus there cannot be any individual access to them. Only the power supply connections 5 and 6 and the measuring connections 7 and 8 are available for access.

The necessary circuit according to FIG. 2 for testing the pair of similar resistors 1 and 4 is obtained when the measuring bridge is supplied on the one hand via power supply connection 5 and on the other hand via measuring connection 8. In this way one arm is obtained from the series connection of the resistors 1, 2 and 4 and a parallel arm is obtained solely from resistor 3. Here to detect an offset drift on the basis of a change of one of the similar resistors 1 or 4, only their connection in series is required, whilst the interposed different resistor 2 impairs this detection. For this reason, resistor 2 is bridged by a switch 9 connected to connections 6 and 7. The total resistance arising from the parallel connection of resistor 2 and the switch resistor 10 is normally very low, depending on the quality of the switch 9, and has a correspondingly low value in comparison with resistors 1 and 4 such that it scarcely influences the offset drift to be determined.

The test circuit includes furthermore a voltage divider 11 comprising two series-connected resistors 12 and 13 for forming the reference voltage. Applied to the voltage divider 11 is the supply voltage VBR of the measuring bridge. Resistors 12 and 13 have a very small drift or respectively a very small synchronism error. The voltage divider 11 divides the supply voltage VBR in a fixed ratio, such that the reference voltage at the connection point 14 between the resistors 12 and 13 is for example ½ VBR.

The test circuit is first calibrated by the initial difference Ukal, between the voltage at the connection point 14 and the voltages at connections 6 and 7 being determined and stored. In the later testing mode, a check is made as to whether an alteration has occurred in this difference by comparison with the value determined during calibration. Alterations in the measured variable and possible disturbance variables such as the fluctuation of the supply voltage or temperature changes have a very small influence.

If the switch 9 or respectively its resistor 10 cannot be realized with a sufficiently low impedance, which can be the case with semiconductor circuits, such that the voltage drop via the bridged resistor 2 cannot be disregarded, then a virtual mean potential has to be formed first. This corresponds to the potential that would occur between resistors 1 and 4 is the value of the total resistance of resistors 2 and 10 were actually zero.

For the circuit according to FIG. 2, the following applies for this mean voltage $U_{MC}$:

$$U_{MC} \approx \frac{U_{BC} + U_{DC}}{2}$$

wherein:
$U_{BC}$=voltage between the connections 7 and 8; and
$U_{DC}$=voltage between the connections 6 and 8.
When $U_{BC}=U_{FC}+U_{BF}$ and $U_{DC}=U_{FC}+U_{DF}$, wherein:
$U_{FC}$=voltage between connection point 14 and connection 8;
$U_{BF}$=voltage between connection 7 and connection point 14; and
$U_{DF}$=voltage between connection point 14 and connection 6, the following is obtained:

$$2*U_{MC} \approx 2*U_{FC}+U_{BF}+U_{DF}, \text{ or respectively,}$$

$$2*(U_{MC}-U_{FC}) \approx U_{BF}+U_{DF}.$$

Thus the value of the "drift voltage" for resistors 1 and 2 is easily obtained from two differential voltage measurements ($U_{BF}$ and $U_{DF}$):

$$2*Udrift_a \approx U_{BF}+U_{DF}-Ukal_a.$$

The calculation of the mean voltage $U_{MC}$ on the basis of two individual measurements can be unfavorable, however. This disadvantage can be eliminated by using a further resistive divider from resistors 15 and 16 (shown in broken lines in FIG. 2). Assuming that resistors 15 and 16 have the same resistance value, the drift voltage is obtained directly from the difference in the voltage $U_{FG}$ (voltage between connection point 14 and connection point 17 between resistors 15 and 16) and the voltage $Ukal_D$ as follows:

$$Udrif_a=U_{FG}-Ukal_a.$$

Thus the drift voltage is obtained as the differential voltage between the stored voltage level and only one measured voltage level $U_{FG}$. Since without the use of the voltage divider 15, 16 the two voltages $U_{BF}$ and $U_{DF}$ have to be measured in succession, and on the other hand the measurement only of the voltage level $U_{FG}$ takes place "simultaneously," accidental disturbances can be better suppressed.

The pair of similar resistors 2 and 3 is tested using the circuit according to FIG. 3. Here on the one hand the series connection of resistor 3, the interfering resistor 1, and resistor 2, and on the other hand only resistor 4, are connected to the supply voltage VBR. Here resistor 1 is bridged by switch 9 (since in FIG. 3 a different switch from that in FIG. 2 can be used for the switch 9, the value of the switch resistance 10 in FIG. 3 can be different from that in FIG. 2). The drift voltage is here obtained according to the following relationship:

$$2*Udrift_b \approx U_{AF}+U_{BF}-Ukal_b; \text{ wherein}$$

$U_{AF}$=the voltage between connection 5 and connection point 14; and
$Ukal_b$=the voltage level obtained during the calibration of the test circuit according to FIG. 3.

If the voltage divider 15, 16 is also used in the circuit according to FIG. 3, the drift voltage Udrift, can also be obtained by measuring only one voltage. A total of two voltage measurements then suffices to detect a drift in respect of, on the one hand, resistors 1 and 4 ($Udrift_a$) and, on the other hand, resistors 2 and 3 ($Udrift_b$).

As is also the case with the known methods, only individual errors can be detected reliably. However, with this method in addition some double errors can also be recognized insofar as the two individual errors do not occur at a pair of similar resistor (1, 4 or 2, 3). In the case of other multiple errors (simultaneous drift/alterations at two similar resistors), the deviations between the two examined resistors can be so superimposed that no part or only a reduced part of the drift can be recognized.

In summary, the method according to the invention offers the following advantages:
very high sensitivity in respect of changes in individual resistors, for example twice the sensitivity in comparison with the solution described in DE 101 33 525 A1;
as against the solution according to DE 101 33 525 A1, no current sources are required in which even small differences affect the determination of the drift relatively strongly;
due to the good suppression of disturbing influences in the determination of the drift, even relatively small offset changes can be detected. In this way, long-term drift effects can be recognized early, even before the sensor becomes completely inaccurate or even unusable; and
no additional information such as current value of the physical variable to be actually measured, temperature or state information from an external control device is necessary.

What is claimed is:

1. Method for detecting an offset drift in a resistive Wheatstone measuring bridge, comprising different configurations in a measuring mode and a testing mode without altering the inner structure of the measuring bridge, wherein in testing mode, two sensor resistors, acting in the same way and lying in different bridge arms, are connected in series and a voltage level occurring in the connection of these sensor resistors is compared with a reference voltage.

2. Method according to claim 1, wherein a sensor resistor, which acts in a different way and lies in the testing mode between the two series-connected sensor resistors acting in the same way, is bridged.

3. Method according to claim 1, wherein in the testing mode, a resistance existing between the two series-connected sensor resistors acting in the same way is compensated by mathematical determination of a mean voltage between the sensor resistors acting in the same way.

4. Method according to claim 1, wherein the reference voltage is formed by resistive division of the voltage applied to the series connection of the sensor resistor.

5. Method according to claim 1, wherein the testing mode comprises two different configurations in such a way that two pairs of sensor resistors respectively acting in the same way are tested in succession.

6. A method for detecting an offset drift in a resistive Wheatstone measuring bridge, the measuring bridge including a first pair of resistors responsive to a variable in one way and a second pair of resistors responsive to the variable in a different way, the first pair including a first resistor and a fourth resistor and the second pair including a second resistor and a third resistor; and wherein the first resistor and the second resistor lie in a first bridge arm and the third resistor and the fourth resistor lie in a second bridge arm, the method comprising:
 connecting resistors of one of the first pair and the second pair of resistors in series; and
 comparing a first voltage level occurring in the connection of the one of the first pair and the second pair of resistors with a reference voltage, wherein an output of the comparison provides a measure of the offset drift.

7. The method according to claim 6, further comprising:
 compensating for a resistance value of a resistor of the other of the first pair of resistors and the second pair of resistors wherein the resistor having the resistance value lies in series with the one of the first pair and the second pair of resistors.

8. The method according to claim 7 wherein compensating for the resistance value further comprises bridging the resistor having the resistance value.

9. The method according to claim 7 wherein compensating for the resistance value further comprises calculating a virtual mean potential between the one of the first pair and the second pair of resistors.

10. The method according to claim 6 wherein connecting resistors of one of the first pair and the second pair of resistors in series further comprises applying a supply voltage across the one of the first pair and the second pair of resistors.

11. The method according to claim 10 wherein comparing the first voltage level occurring in the connection of the one of the first pair and the second pair of resistors with the reference voltage further comprises measuring a voltage drop between the first voltage level and the reference voltage wherein the first voltage level is formed by a first resistive divider comprising at least two additional resistors in series with the one of the first pair and the second pair of resistors and the reference voltage is formed by a second resistive divider in parallel with the one of the first pair and the second pair of resistors.

12. The method according to claim 11, further comprising:
 subtracting a calibration value from the voltage drop to obtain a drift voltage.

13. The method according to claim 6, further comprising:
 adjusting the comparison of the first voltage level with the reference voltage using a calibration value.

14. The method according to claim 13, further comprising:
 calculating the calibration value, the calibration value based upon a difference between the reference voltage and a first voltage drop across one resistor of the one of the first pair and the second pair of resistors and a second voltage drop across the other resistor of the one of the first pair and the second pair of resistors and a resistor of the other of the first pair and the second pair of resistors wherein the resistor of the other of the first pair and the second pair of resistors lies in series between the one resistor and the other resistor of the one of the first pair and the second pair of resistors.

15. The method according to claim 6, further comprising:
 connecting resistors of the other of the first pair and the second pair of resistors in series; and
 comparing a second voltage level occurring in the connection of the other of the first pair and the second pair of resistors with the reference voltage wherein an output of the comparison provides a measure of an offset drift of the other of the first pair and the second pair of resistors.

16. An apparatus for detecting an offset drift in a resistive Wheatstone measuring bridge, the measuring bridge including a first pair of resistors responsive to a variable in one way and a second pair of resistors responsive to the variable in a different way, the first pair including a first resistor and a fourth resistor and the second pair including a second resistor and a third resistor, and wherein the first resistor and the second resistor lie in a first bridge arm and the third resistor and the fourth resistor lie in a second bridge arm, the apparatus comprising:
 a voltage source coupled to one of the resistors of the first pair of resistors, wherein resistors of the first pair are coupled in series; and
 means for comparing a voltage level occurring in the connection of the first pair to a reference voltage, the output of the comparison means providing a measure of the offset drift.

17. The apparatus according to claim 16, further comprising:
 a switch bridging one resistor of the second pair of resistors, the one resistor located in series with and between the first pair of resistors.

18. The apparatus according to claim 16 wherein the comparison means further comprises a first voltage divider located in series with and between the first pair of resistors, the first voltage divider providing the voltage level.

19. The apparatus according to claim 18, further comprising:
 a second voltage divider coupled to the voltage source and supplying the reference voltage.

20. The apparatus according to claim 16, further comprising:
 a voltage divider coupled to the voltage source and supplying the reference voltage.

* * * * *